(12) United States Patent
Shabbir et al.

(10) Patent No.: US 9,645,634 B2
(45) Date of Patent: May 9, 2017

(54) SYSTEMS AND METHODS FOR NON-UNIFORM POWER SUPPLY UNIT LOAD SHARING

(71) Applicant: Dell Products L.P., Round Rock, TX (US)

(72) Inventors: Hasnain Shabbir, Round Rock, TX (US); Dinesh Kunnathur Ragupathi, Round Rock, TX (US); John Erven Jenne, Austin, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 14/671,270

(22) Filed: Mar. 27, 2015

(65) Prior Publication Data
US 2016/0282928 A1 Sep. 29, 2016

(51) Int. Cl.
G06F 1/26 (2006.01)
G06F 1/32 (2006.01)
G06F 1/20 (2006.01)
H02J 7/00 (2006.01)
H02J 7/14 (2006.01)

(52) U.S. Cl.
CPC .......... *G06F 1/3287* (2013.01); *G06F 1/3243* (2013.01); *G06F 1/3253* (2013.01); *G06F 1/3296* (2013.01); *G06F 1/206* (2013.01); *G06F 1/26* (2013.01); *G06F 1/3212* (2013.01); *G06F 2212/7204* (2013.01); *H02J 7/0091* (2013.01); *H02J 7/1423* (2013.01)

(58) Field of Classification Search
CPC .......... G06F 1/206; G06F 1/26; G06F 1/3212; G06F 2212/7204; H02J 7/0091; H02J 7/1423
USPC .................. 713/300, 320, 323, 330, 340
See application file for complete search history.

(56) References Cited

U.S. PATENT DOCUMENTS

| 2012/0098543 A1* | 4/2012 | Rutkowski | H01M 2/1077 324/435 |
| 2014/0091751 A1* | 4/2014 | Workman | H02J 7/0013 320/106 |

* cited by examiner

*Primary Examiner* — Michael J Brown
(74) *Attorney, Agent, or Firm* — Jackson Walker L.L.P.

(57) ABSTRACT

In accordance with embodiments of the present disclosure, an information handling system may include at least one information handling resource and a controller. The controller may be configured to receive signals from a plurality of power supply units, each signal indicative of a temperature associated with a respective power supply of the plurality of power supply units. The controller may also be configured to determine, for each of the plurality of power supply units, a respective derating limit based on the respective signal indicative of the temperature for such power supply unit. The controller may be further configured to communicate messages to each of the plurality of power supply units, each message indicative of the respective derating limit determined with respect to such power supply unit.

20 Claims, 3 Drawing Sheets

FIG. 3

| POWER SUPPLY | GRID | CAPACITY | CALCULATED DERATING LIMIT | POWER OUTPUT |
|---|---|---|---|---|
| 1 | A | 3000W | 2200W | 2050W |
| 2 | A | 3000W | 2000W | 1850W |
| 3 | A | 3000W | 1500W | 1500W |
| 4 | B | 3000W | 1500W | 1500W |
| 5 | B | 3000W | 2000W | 1850W |
| 6 | B | 3000W | 2200W | 2050W |
| TOTALS | | 18000W | 11400W | 10800W |

FIG. 4

| POWER SUPPLY | GRID | CAPACITY | CALCULATED DERATING LIMIT | POWER OUTPUT (IMMEDIATELY AFTER GRID FAILURE) | POWER OUTPUT (LOAD SHARING APPLIED) |
|---|---|---|---|---|---|
| 1 | A | 3000W | 2200W | 3000W | 2200W |
| 2 | A | 3000W | 2000W | 3000W | 2000W |
| 3 | A | 3000W | 1500W | 3000W | 1500W |
| 4 | B | - | - | - | - |
| 5 | B | - | - | - | - |
| 6 | B | - | - | - | - |
| TOTALS | | 9000W | 5700W | 9000W | 5700W |

SYSTEMS AND METHODS FOR NON-UNIFORM POWER SUPPLY UNIT LOAD SHARING

TECHNICAL FIELD

The present disclosure relates in general to information handling systems, and more particularly to systems and methods for non-uniform load sharing among power supply units by applying per-power-supply-unit derating limits.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. In many existing approaches, a power supply unit may have associated therewith one or more temperature sensors that detect one or more temperatures associated with the power supply unit, for example ambient temperature at an inlet of airflow to the power supply unit, component temperature of the power train of the power supply unit, etc. Many such power supply units also have associated therewith a control system configured to control the power output of a power supply unit based on the temperature measurements of the sensors, so as to reduce the likelihood of overheating of the power supply which may cause damage thereto. Thus, in response to increasing temperatures, control logic of an information handling system may decrease the amount of power demanded from the power supply, such that the power output of the power supply may be reduced as a result of the temperature increase.

Many information handling systems may include a plurality of power supply units for purposes of redundancy, serviceability, and/or other advantages. In traditional approaches, the power demands of an information handling system are typically shared equally among the various active power supply units of the information handling system. Thus, in such approaches, control logic of the information handling system may use the highest temperature reading from all of the power supply units in a system in order to determine a maximum power demand of the information handling system which has the effect of uniformly derating all power supply units. Such an approach may unnecessarily reduce power available to the information handling system as some of the power supply units may be effectively derated to a power level lower than that which they could support and still remain within temperature limits of the power supply unit.

SUMMARY

In accordance with the teachings of the present disclosure, the disadvantages and problems associated with existing approaches to power supply unit load sharing may be reduced or eliminated.

In accordance with embodiments of the present disclosure, an information handling system may include at least one information handling resource and a controller. The controller may be configured to receive signals from a plurality of power supply units, each signal indicative of a temperature associated with a respective power supply of the plurality of power supply units. The controller may also be configured to determine, for each of the plurality of power supply units, a respective derating limit based on the respective signal indicative of the temperature for such power supply unit. The controller may be further configured to communicate messages to each of the plurality of power supply units, each message indicative of the respective derating limit determined with respect to such power supply unit.

In accordance with these and other embodiments of the present disclosure, a method may include receiving signals from a plurality of power supply units, each signal indicative of a temperature associated with a respective power supply of a plurality of power supply units. The method may also include determining, for each of the plurality of power supply units, a respective derating limit based on the respective signal indicative of the temperature for such power supply unit. The method may further include communicating messages to each of the plurality of power supply units, each message indicative of the respective derating limit determined with respect to such power supply unit.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to: 9i) receive signals from a plurality of power supply units, each signal indicative of a temperature associated with a respective power supply of a plurality of power supply units; (ii) determine, for each of the plurality of power supply units, a respective derating limit based on the respective signal indicative of the temperature for such power supply unit; and (iii) communicate messages to each of the plurality of power supply units, each message indicative of the respective derating limit determined with respect to such power supply unit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a table setting forth an example application of non-balanced load-sharing, in accordance with embodiments of the present disclosure; and FIG. 4 illustrates a table setting forth an example application of non-balanced load-sharing in response to a grid failure, in accordance with embodiments of the present disclosure.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
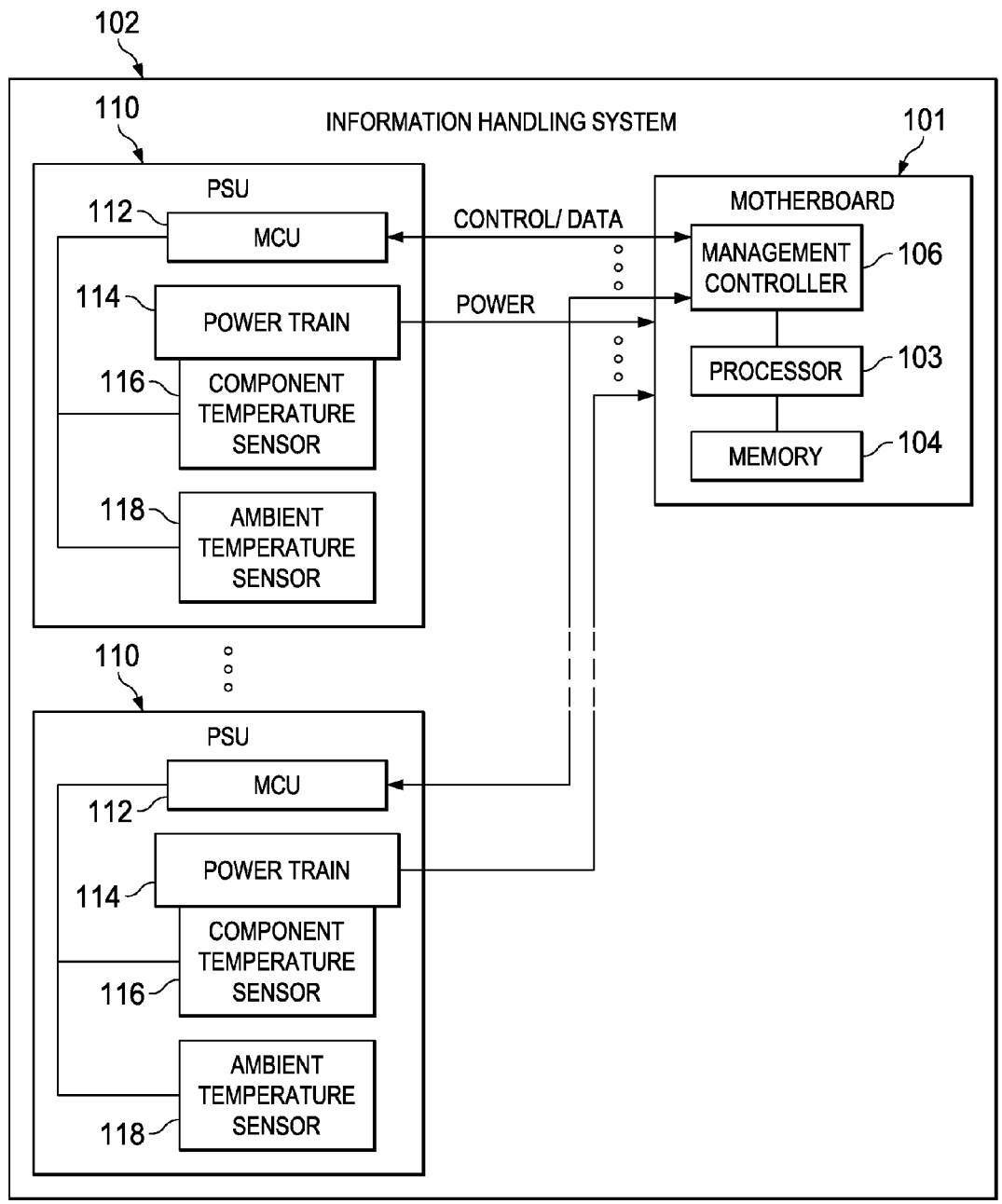
FIG. 1 illustrates a block diagram of an example information handling system, in accordance with embodiments of the present disclosure.

FIG. 1 illustrates a block diagram of an example of an information handling system 102. As depicted, information handling system 102 may include a plurality of power supply units (PSUs) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller of Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, as discussed in greater detail below with respect to FIG. 2, PSUs 110 may communicate sensor information associated with component temperature sensor 116 and ambient temperature sensor 118 to management controller 106, from which management controller 106 may calculate a PSU derating limit for each PSU 110. Based on the calculated derating limits, management controller 106 may communicate individually to each PSU 110 its calculated derating limit. Each PSU 110 may then operate and output power in accordance with its calculated derating limit.

Generally speaking, a PSU 110 may include any system, device, or apparatus configured to supply electrical current to one or more information handling resources of information handling system 102. As shown in FIG. 1, PSU 110 may include a microcontroller unit (MCU) 112, a power train 114, a component temperature sensor 116, and an ambient temperature sensor 118.

MCU 112 may comprise a microprocessor, DSP, ASIC, FPGA, EEPROM, or any combination thereof, or any other device, system, or apparatus for controlling operation of its associated PSU 110. As such, MCU 112 may comprise firmware, logic, and/or data for controlling functionality of such PSU 110.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator).

Component temperature sensor 116 may be communicatively coupled to MCU 112 and may include any system, device, or apparatus (e.g., a thermometer, thermistor, etc.) configured to communicate a signal to MCU 112 indicative of a temperature at or near a component of power train 114 (e.g., a converter, heatsink, transistor, or other component of power train 114).

Ambient temperature sensor 118 may be communicatively coupled to MCU 112 and may include any system, device, or apparatus (e.g., a thermometer, thermistor, etc.) configured to communicate a signal to MCU 112 indicative of a temperature ambient to PSU 110 (e.g., an inlet air temperature for airflow into or by PSU 110).

In addition to motherboard 101, processor 103, memory 104, management controller 106, and PSU 110, information handling system 102 may include one or more other information handling resources.

Figure 2:
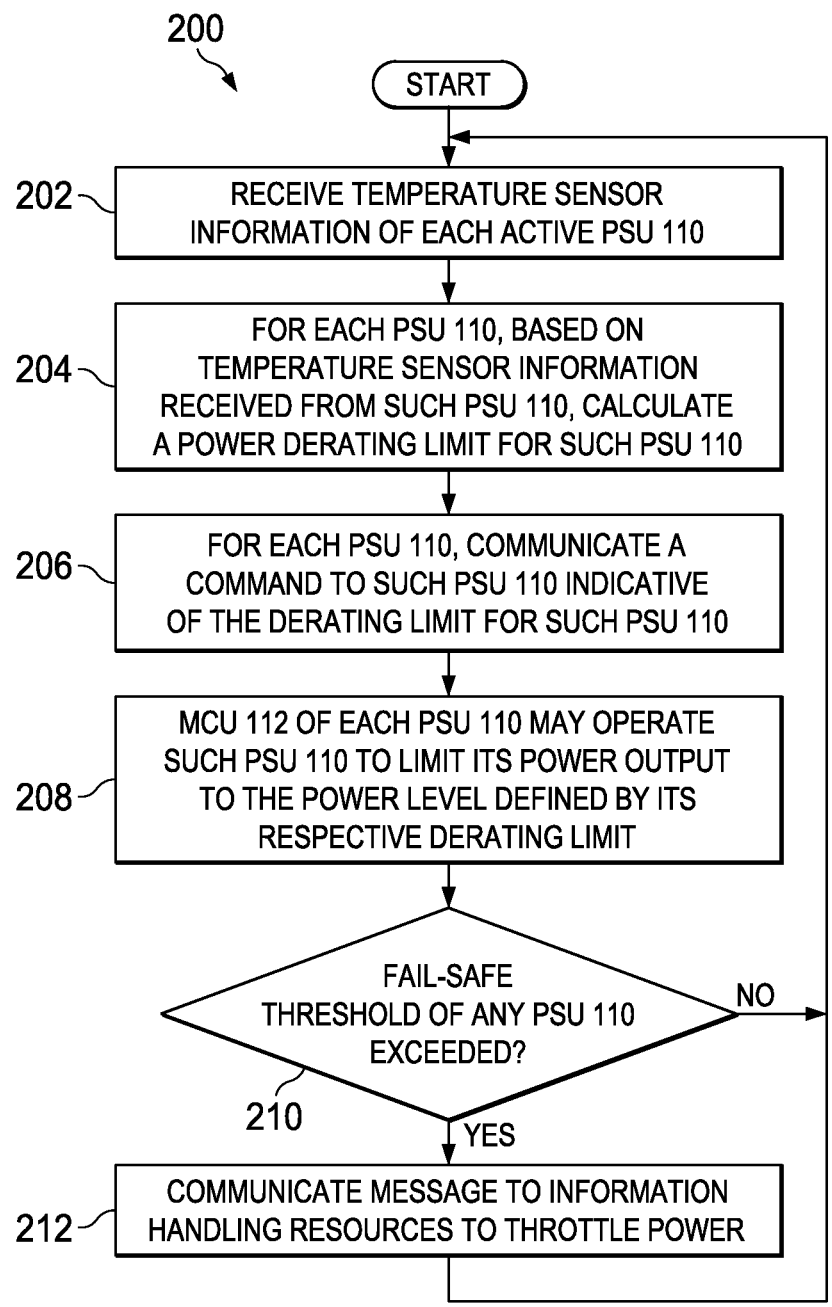
FIG. 2 illustrates a flow chart of an example method for non-uniform power supply unit load sharing, in accordance with embodiments of the present disclosure.

FIG. 2 illustrates a flow chart of an example method 200 for non-uniform PSU load sharing, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 106 may receive temperature sensor information (e.g., from component temperature sensor 116 and/or ambient temperature sensor 118) of each active PSU 110. In some embodiments, such thermal information may be collected from each PSU 110 via a Power Management Bus (PMBus) interface coupling management controller 106 to each of PSUs 110.

At step 204, management controller 106 may, for each PSU 110, based on temperature sensor information received from such PSU 110 and/or other information (e.g., manufacturer or vendor specifications for such PSU 110), calculate a power derating limit for such PSU 110. Any suitable systems and/or methods may be employed to calculate the derating limit including, without limitation, those systems and methods described in U.S. patent application Ser. No. 14/657,137 filed Mar. 13, 2015 and entitled "Systems and Methods for Power Unit Supply Derating." Thus, management controller 106 may calculate a per-PSU derating limit based on each individual PSU's thermal parameters.

At step 206, management controller 106 may, for each PSU 110, communicate a command to such PSU 110 indicative of the derating limit for such PSU 110. In some embodiments, such commands may be communicated to each respective PSU 110 via a PMBus interface coupling management controller 106 to each of PSUs 110.

At step 208, in response to the derating limits communicated to each PSU 110, MCU 112 of each PSU 110 may operate such PSU 110 to limit its power output to the power level defined by its respective derating limit.

At step 210, management controller 106 may, for each PSU 110, based on temperature sensor information received from such PSU 110 and/or other information (e.g., manufacturer or vendor specifications for such PSU 110), determine whether a fail-safe threshold (e.g., over-temperature threshold) for a PSU 110 has been exceeded. If no fail-safe threshold has been exceeded, method 200 may proceed again to step 200. Otherwise, method 200 may proceed to step 212.

At step 212, in response to a fail-safe threshold of a PSU 110 being exceeded, management controller 106 may communicate a message to other information handling resources (e.g., processor 103, memory 104) to throttle power demand, in order to reduce the power output by the one or more PSUs 110 having its fail-safe threshold exceeded.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

FIG. 3 illustrates a table 300 setting forth an example application of non-balanced load-sharing, in accordance with embodiments of the present disclosure. In the example represented by FIG. 3, an information handling system 102 may include six PSUs 110 enumerated 1, 2, 3, 4, 5, and 6, wherein PSUs 1, 2, and 3 are supplied electrical energy by a first power grid A and PSUs 4, 5, and 6 are supplied electrical energy by a second power grid B. For purposes of illustration, it is assumed each of the six PSUs 110 has a capacity to generate 3000 W when not operating at a derated power level. Also, in the example, based on thermal parameters of the individual PSUs 1, 2, 3, 4, 5, and 6, management controller 106 may calculate derating limits of 2200 W, 2000 W, 1500 W, 1500 W, 2000 W, and 2200 W, respectively, for a total of 11400 W of available power. Furthermore, in the example it is assumed that 10800 W of power is demanded by the information handling system 102 in which the PSUs 110 are resident. In accordance with their respective derating limits, the PSUs 110 may supply power responsive to the power demand, with PSUs 3 and 4 supplying power at their derating limits and the PSUs 1, 2, 5, and 6 having capacity within their derating limits to supply the remainder of the demand. For comparison, under existing approaches to load sharing, all PSUs 110 would have shared equally in providing power, and the power demand of information handling system 102 would have been throttled to a level to keep all PSUs operating at 1500 W of output power in order to keep PSUs 3 and 4 below their thermal limits, which would result in 9000 W of power being supplied to information handling system 102 instead of the desired 10800 W of power. In other words, in this example, non-uniform load sharing based on a per-PSU derating limit provided an additional 2400 W (11400 W-9000 W) of additional power, which may in turn reduce the frequency of throttling of information handling resources, thus increasing system performance while still maintaining each of PSUs 110 below their thermal limits. Thus, while traditional approaches may reduce over-temperature conditions of PSUs 110 by reducing a power load demanded from PSUs 110, the approaches set forth herein may reduce over-temperature conditions of PSUs 110 by supply-limiting output of PSUs 110 on a per-PSU basis. The approach of supply-limited output of PSUs 110 on a per-PSU basis which may be coupled with existing power and/or thermal fail-safe protections, including without limitation throttling of demand in response to alerts should over-temperature thresholds, over-current thresholds, or other conditions for alerts by a PSU 110 (e.g., System Management Bus alerts) be triggered despite operating in a non-uniform load sharing environment.

FIG. 4 illustrates a table 400 setting forth an example application of non-balanced load-sharing in response to a grid failure in the scenario shown in FIG. 3, in accordance with embodiments of the present disclosure. In this example, a grid failure occurs in grid B which has the effect of disabling PSUs 4, 5, and 6 from supplying power to information handling system 102. In immediate response to such failure, PSUs 1, 2, and 3 may temporarily ignore their derating limits and supply power at their maximum capacities (e.g., 3000 W in the present example) in order to provide as much power to information handling system 102 (e.g., 9000 W total in the present example of the 10800 demanded by information handling resources of information handling system 102) in order to reduce the likelihood of shutdown of information handling system 102 as a result of the loss of grid B. Shortly after the grid failure, PSUs 1, 2, and 3 may return to operating at their derating limits so as to avoid over-temperature conditions from occurring within PSUs 1, 2, and 3. As a result, PSUs 1, 2, and 3 would provide a total of 5700 W to information handling system 102, compared to the 4500 W of power which would be provided in a traditional balanced approach, thus minimizing the impact of thermal limits of PSUs 1, 2, and 3 as compared to traditional power management approaches.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   at least one information handling resource; and
   a controller configured to:
      receive signals from a plurality of power supply units, each signal indicative of a temperature associated with a respective power supply of the plurality of power supply units;
      determine, for each of the plurality of power supply units, a respective derating limit based on the respective signal indicative of the temperature for such power supply unit, the derating limit defining a maximum amount of power to be delivered by such power supply unit in order to avoid operating such power supply in excess of a thermal limit of such power supply; and
      communicate messages to each of the plurality of power supply units, each message indicative of the respective derating limit determined with respect to such power supply unit.

2. The information handling system of claim 1, wherein communication of the respective derating limit for a power supply unit of the plurality of power supply units causes the power supply unit to deliver power at an amount limited by the derating limit and independent of derating limits of the other power supply units of the plurality of power supply units.

3. The information handling system of claim 2, further comprising the plurality of power supply units, wherein each of the power supply units are configured to momentarily deliver power in excess of the derating limit in response to a power event.

4. The information handling system of claim 3, wherein the power event comprises failure of a power grid coupled to at least one of the plurality of power supply units.

5. The information handling system of claim 1, wherein the signals from the plurality of power supply units are received by the controller via a Power Management Bus.

6. The information handling system of claim 1, wherein the messages to each of the plurality of power supply units are communicated via a Power Management Bus.

7. The information handling system of claim 1, the controller further configured to:
   determine, for each of the plurality of power supply units, whether a fail-safe threshold has been exceeded based on the respective signal indicative of the temperature for such power supply unit; and
   responsive to determining that at least one of the plurality of power supply units has exceeded its fail-safe threshold, throttle power demand of the at least one information handling resource.

8. A method comprising:
receiving signals from a plurality of power supply units, each signal indicative of a temperature associated with a respective power supply of a plurality of power supply units;
determining, for each of the plurality of power supply units, a respective derating limit based on the respective signal indicative of the temperature for such power supply unit, the derating limit defining a maximum amount of power to be delivered by such power supply unit in order to avoid operating such power supply in excess of a thermal limit of such power supply; and
communicating messages to each of the plurality of power supply units, each message indicative of the respective derating limit determined with respect to such power supply unit.

9. The method of claim 8, wherein communication of the respective derating limit for a power supply unit of the plurality of power supply units causes the power supply unit to deliver power at an amount limited by the derating limit and independent of derating limits of the other power supply units of the plurality of power supply units.

10. The method of claim 9, further comprising the plurality of power supply units momentarily delivering power in excess of the derating limit in response to a power event.

11. The method of claim 10, wherein the power event comprises failure of a power grid coupled to at least one of the plurality of power supply units.

12. The method of claim 8, wherein receiving the signals from the plurality of power supply units comprises receiving the signals via a Power Management Bus.

13. The method of claim 8, wherein communicating the messages to each of the plurality of power supply units comprises communicating the messages via a Power Management Bus.

14. The method of claim 8, further comprising:
determining, for each of the plurality of power supply units, whether a fail-safe threshold has been exceeded based on the respective signal indicative of the temperature for such power supply unit; and
responsive to determining that at least one of the plurality of power supply units has exceeded its fail-safe threshold, throttling power demand of the at least one information handling resource.

15. An article of manufacture comprising:
a non-transitory computer-readable medium; and
computer-executable instructions carried on the computer-readable medium, the instructions readable by a processor, the instructions, when read and executed, for causing the processor to:
receive signals from a plurality of power supply units, each signal indicative of a temperature associated with a respective power supply of a plurality of power supply units;
determine, for each of the plurality of power supply units, a respective derating limit based on the respective signal indicative of the temperature for such power supply unit, the derating limit defining a maximum amount of power to be delivered by such power supply unit in order to avoid operating such power supply in excess of a thermal limit of such power supply; and
communicate messages to each of the plurality of power supply units, each message indicative of the respective derating limit determined with respect to such power supply unit.

16. The article of claim 15, wherein communication of the respective derating limit for a power supply unit of the plurality of power supply units causes the power supply unit to deliver power at an amount limited by the derating limit and independent of derating limits of the other power supply units of the plurality of power supply units.

17. The article of claim 16, further comprising the plurality of power supply units configured to momentarily deliver power in excess of the derating limit in response to a power event.

18. The article of claim 17, wherein the power event comprises failure of a power grid coupled to at least one of the plurality of power supply units.

19. The article of claim 15, wherein receiving the signals from the plurality of power supply units comprises receiving the signals via a Power Management Bus.

20. The article of claim 15, wherein communicating the messages to each of the plurality of power supply units comprises communicating the messages via a Power Management Bus.

* * * * *